United States Patent
McBride et al.

(10) Patent No.: US 7,255,015 B2
(45) Date of Patent: Aug. 14, 2007

(54) OCCUPANT WEIGHT SENSOR FOR VEHICULAR SEATS, METHOD FOR MAKING AND SYSTEM THEREFOR

(75) Inventors: Timothy M. McBride, Sharon, MA (US); Edward F. O'Brien, Rehoboth, MA (US); David P. Hatch, Whitinsville, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 445 days.

(21) Appl. No.: 10/874,963

(22) Filed: Jun. 23, 2004

(65) Prior Publication Data

US 2005/0023065 A1  Feb. 3, 2005

Related U.S. Application Data

(60) Provisional application No. 60/491,417, filed on Jul. 31, 2003.

(51) Int. Cl.
*G01L 1/22* (2006.01)

(52) U.S. Cl. .................. 73/862.474; 73/862.044; 73/862.045; 73/862.06

(58) Field of Classification Search ........... 73/862.044, 73/862.045, 862.06, 862.474
See application file for complete search history.

(56) References Cited

U.S. PATENT DOCUMENTS

| | | | |
|---|---|---|---|
| 3,252,831 A * | 5/1966 | Ragan | 428/427 |
| 5,991,676 A * | 11/1999 | Podoloff et al. | 701/45 |
| 6,244,116 B1 * | 6/2001 | Osmer et al. | 73/862.474 |
| 6,345,543 B1 | 2/2002 | Aoki | |
| 6,453,747 B1 | 9/2002 | Weise et al. | |
| 6,646,446 B2 | 11/2003 | Maher et al. | |
| 7,044,006 B2 * | 5/2006 | Kouyama et al. | 73/862.381 |
| 7,047,823 B2 * | 5/2006 | Wilkie et al. | 73/862.045 |
| 7,112,749 B2 * | 9/2006 | DiPaola et al. | 177/136 |
| 2003/0213623 A1 * | 11/2003 | Axakov et al. | 177/229 |
| 2004/0124018 A1 * | 7/2004 | Yanagi | 177/144 |
| 2005/0284238 A1 * | 12/2005 | Wilkie et al. | 73/862.045 |
| 2005/0284669 A1 * | 12/2005 | DiPaola et al. | 177/136 |
| 2005/0284688 A1 | 12/2005 | Hida et al. | |

FOREIGN PATENT DOCUMENTS

| | | |
|---|---|---|
| DE | 29917639 U1 | 3/2000 |
| DE | 10145369 A2 | 4/2003 |
| WO | WO98/25112 A2 | 9/2002 |
| WO | WO 2004079308 A | 9/2004 |

* cited by examiner

*Primary Examiner*—Edward Lefkowitz
(74) *Attorney, Agent, or Firm*—Russell E. Baumann

(57) ABSTRACT

An occupant weight sensor (1) for placement between a frame (7) fixed to the chassis of a vehicle and a second frame (8) supporting a vehicle seat has a sense element having a first body (12, 22, 28, 34, 50, 62, 64, 68) formed with a planar sense surface on which are mounted piezoresistors electrically connected in a Wheatstone bridge configuration. A post (12a, 22c, 28c, 34e, 50b, 62a, 64a, 68b) extends outwardly from the first body for attachment to the first frame. A second body is formed with a force transfer portion (14a, 24g, 30d, 36b, 52a, 70a) permanently attached to the first body along an outer periphery circumscribing the sense surface. The piezoresistors are electrically connected to conditioning electronics received in a chamber formed between the two bodies. The effects of parasitic loads on the sense element are minimized by selected placement of the piezoresistors on the sense surface. Several variations are disclosed for attaching the sensor to the first and second frames and both longitudinally and laterally extending electrical connectors are shown.

18 Claims, 10 Drawing Sheets

OCCUPANT WEIGHT SENSOR FOR VEHICULAR SEATS, METHOD FOR MAKING AND SYSTEM THEREFOR

CLAIM OF PRIORITY

The application claims priority under 35 U.S.C. Section 119 (e)(1) of provisional application No. 60/491,417 filed Jul. 31, 2003.

CROSS REFERENCE TO RELATED APPLICATIONS

U.S. Pat. No. 7,047,823 and 7,112,749, both filed on Jun. 23, 2004 and assigned to the assignee of the present invention contain subject matter related to the subject matter of this application.

FIELD OF THE INVENTION

This invention relates generally to weight sensors and more particularly to weight sensors used for weighing occupants of a vehicular seat in order to prevent or modify airbag deployment for improved safety of the seat occupant.

BACKGROUND OF THE INVENTION

Governmental legislation requires the development of a system capable of sensing information related to front passenger seat occupants and classifying such occupants to the extent necessary to adapt airbag deployment to improve passenger safety. For example, airbag deployment can be a problem for small children or children in car seats occupying a front passenger seat. Using information provided by vehicular seat weight sensors, a control system can override the normal airbag actuation mechanism and prevent airbag deployment when such a child occupies a seat having appropriate weight sensors. In other situations, airbag deployment can remain active but its intensity can be modulated in response to sensed weight information, for example, when the occupant is incorrectly positioned or is within some intermediate weight classification.

SUMMARY OF THE INVENTION

An object of the present invention is the provision of weight sensor apparatus having sense elements with high sensitivity, good stability, good environmental resistance, strong overstress capability and good rejection of parasitic loads.

Another object of the invention is the provision of a vehicular seat occupant weight sensor apparatus for measuring an occupant's weight by sensing the force transmitted to the vehicle floor from the seat.

Yet another object of the invention is the provision of a seat weight sensor having an output signal that is proportional to seat weight, that is accurate from −40 degrees C. to 115 degrees C., that has minimal vertical height and that is stable over time and during overload exposures (for example, as a result of accidents).

Another object of the invention is the provision of a sensor having self-diagnosis capability for informing the control system when certain malfunctions are present in the sensor output or in the electrical connection between the sensor and the system.

Still another object of the invention is the provision of such a sensor which will not compromise the mechanical integrity of existing seat assembly architectures during overload exposures (e.g., accidents) as well as the provision of packaging and means of attachment which permit easy incorporation into the vehicle assembly during a high volume production.

Briefly, an occupant weight sensor for a vehicular seat made in accordance with the invention is adapted for interposition between a first frame fixedly attached to the chassis of a vehicle and the seat, for example, a second frame which supports the seat and comprises a sense element having a first body with a generally flat surface having an outer periphery and with piezoresistors attached to the surface and electrically connected in a full Wheatstone configuration. A post extends outwardly from the first body along a first longitudinal axis for attachment to the first frame. A second body is formed with a force transfer portion permanently attached to the first body along the outer periphery thereof and has a mounting portion for attachment to the second frame. In one preferred embodiment, the second body is formed as an elongated plate with the force transfer portion centrally located between first and second ends of the plate and with a mounting hole formed adjacent to each end for attachment to the second frame. In other preferred embodiments the second body has an end wall and a tubular sidewall. The tubular sidewall serves as the force transfer portion and a second post extends outwardly from the end wall along a second longitudinal axis which is generally coincident with the first longitudinal axis when the first and second bodies are attached to one another.

Conditioning electronics and a connector are provided for conditioning the bridge output signal and providing electrical power and output.

Although various configurations can be employed for the flat sense surface, a generally circular surface is preferred. According to a feature of the invention, the piezoresistors are disposed on the sense surface at selected locations to minimize affects of parasitic loads. In one preferred embodiment having a circular sense surface, the full bridge comprises first and second half bridges wherein the first half bridge has a first piezoresistor disposed adjacent to the outer periphery of the first body at one end of a common diameter and a second piezoresistor disposed adjacent to the center of the circular sense surface and the second half bridge has a third piezoresistor disposed adjacent to the center of the sense surface and a fourth piezoresistor disposed adjacent to the outer periphery of the sense surface at the opposite end of the common diameter.

In another preferred embodiment having a circular sense surface, the full bridge comprises first and second half bridges wherein the first half bridge has a first piezoresistor aligned radially adjacent to the outer periphery of the sense element along a common diameter on one side of the center of the circular surface and a second piezoresistor aligned tangentially disposed closely adjacent to the first piezoresistor, and the second half bridge has third and fourth piezoresistors similarly disposed on the sense surface diametrically opposed to the first and second piezoresistors.

According to a feature of the invention, the piezoresistors are composed of monocrystalline silicon which are glass bonded to the sense surface to provide strong signal to noise ratios and high levels of mechanical safety factor. If desired, the piezoresistors of one or more half bridges may be formed on the same piece of silicon.

According to a modified preferred embodiment, a second full Wheatstone bridge can be provided having piezoresistors disposed 180 degrees from the piezoresistors of the first fill bridge. In this embodiment a summing circuit is connected to the outputs of each full bridge to mitigate affects of parasitic mechanical loads on axially loaded sensors.

According to a preferred embodiment of the invention, the sense element comprises a first generally cylindrical body having a first longitudinal axis and a portion formed with a circular flat sense surface lying in a plane generally perpendicular to the first longitudinal axis. The body has an outer periphery circumscribing the sense surface. A plurality of strain gauges are disposed on the sense surface and a post extends outwardly from the body along the first longitudinal axis. A second body is attached to the outer periphery of the first body and has a second longitudinal axis generally coincident with the first longitudinal axis when the two bodies are attached to one another and a second post extends outwardly from the second body along the second longitudinal axis. An annular axial load applying surface is formed on the second body circumscribing the second post and an annular load reacting surface is formed on and circumscribes the first post and a circumferential groove is formed in the outer surface of the first body forming a web extending between the outer periphery of the first body and the first post to mitigate the affects of parasitic loads applied to the sensor. According to a feature of one embodiment, the web is formed with a selected length which is greater than the width of the web.

BRIEF DESCRIPTION OF THE DRAWINGS

Other objects, advantages and details of the occupant weight sensor for vehicular seats and system therefore of the invention appear in the following detailed description referring to the drawings in which:

FIG. 6 is a perspective view of an occupant weight sensor made in accordance with a fourth embodiment of the invention, also shown in FIG. 1a.

DETAILED DESCRIPTION OF PREFERRED EMBODIMENTS

Occupant weight sensors made in accordance with the invention employ monocrystalline silicon strain gauge technology to convert mechanical inputs from the system, i.e., the weight of the occupant of the seat into electrical signals. Such technology used for various automotive pressure sensing applications is known, as shown and described in U.S. Pat. No. 6,453,747, assigned to the assignee of the present invention, the subject matter of which is incorporated herein by this reference.

Mechanical input to the sensor produces stress in the silicon piezoresistors which have the property in which their resistance undergoes a relative change in proportion to the applied stress. The piezoresistor effect in monocrystalline silicon is extremely strong with an equivalent gauge factor of approximately 150. This feature enables strong signal to noise ratios compared to other strain gauge technologies such as bonded metal foil or thick film ink with gauge factors in the range of approximately 3-20. Having a strong signal to noise ratio is important in vehicular occupant weight sensing applications where overstress requirements are severe. Having such a high gauge factor, results in operating stresses 7-50 times smaller than in competitive technologies for a fixed signal size thereby enhancing the mechanical safety factor.

The piezoresistors are electrically connected to form a full Wheatstone bridge. The bridge provides a differential output voltage which is proportional to the applied mechanical input, i.e., occupant weight. This signal is calibrated and compensated with a bridge conditioning ASIC to ultimately provide the system with a signal proportional to the externally applied weight. The ASIC provides full conditioning of the sensor output over the entire operating range of force and temperature. While it is preferred that the output is supply-ratiometric analog, other output formats could be used if desired, such as PWM (pulse width modulation) or low level bus. In addition to providing a force signal, an option could be included to provide a temperature signal to the system. For example, a temperature signal could be provided on a continuous basis on an extra connector pin or it could be time multiplexed into the force signal pin. The conditioning electronics can also be provided with self-diagnosis for informing the control system when certain malfunctions are present in the sensor output or in the electrical connection between the sensor and the system as taught in copending application Ser. No. 09/952,257, Publication No. US-2002-0033700-A1, assigned to the assignee of the present invention, the subject matter of which is incorporated herein by this reference.

Figure 1:
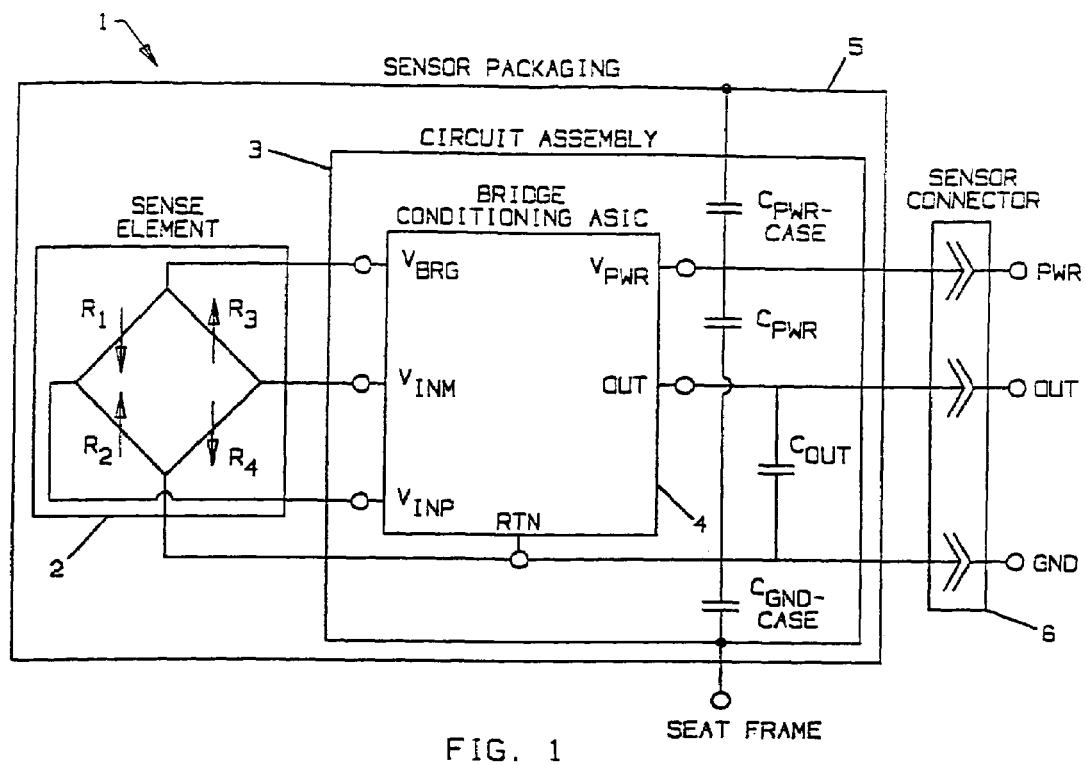
FIG. 1 is a schematic diagram of an occupant weight sensor made in accordance with the invention.

With reference to FIG. 1, occupant weight sensor 1, made in accordance with the invention includes a sense element 2, a circuit assembly 3, a bridge conditioning ASIC 4, a sensor package 5 and a connector 6. Sense element 2 comprises piezoresistors R1, R2, R3 and R4 electrically connected to form a full Wheatstone bridge and with piezoresistors R1, R4 decreasing in resistance and piezoresistors R2 and R3 increasing in resistance with increasing load. The bridge is electrically connected to bridge conditioning ASIC 4 with bridge voltage pin $V_{BRG}$ of ASIC 4 connected to the junction of piezoresistors R1, R3, input pins $V_{INM}$ and $V_{INP}$ of ASIC 4 connected to the junction of piezoresistors R3, R4 and R2, R1, respectively. The junction of piezoresistors R2, R4 is connected to pin RTN of ASIC 4 and to ground GND of connector 6. The ASIC has a power pin $V_{pwr}$ and an output pin OUT connected to power PWR and output OUT, respectively, of connector 6. Circuit assembly 3 also includes several suitable filter capacitors.

Figure 1A:
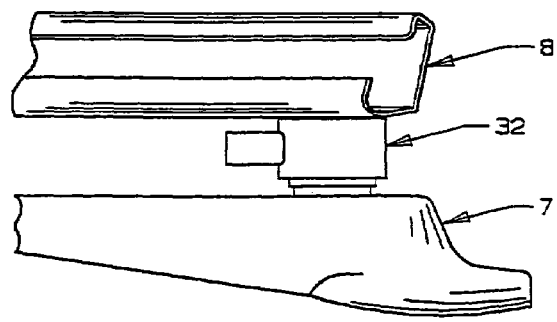
FIG. 1a is a front elevational view showing a first, broken away, frame for fixed attachment to a vehicle chassis and a second, broken away, seat support frame with an occupant weight sensor made in accordance with one of the preferred embodiments of the invention interposed between the frames.

FIG. 1a shows one possible position of an occupant weight sensor when mounted for use in a vehicle. An occupant weight sensor 32 is shown made according to one of the preferred embodiments to be described below interposed between a first, broken away, frame 7 for fixed attachment to the chassis of a vehicle and a second, broken away, seat support frame 8. It will be understood that the sensor could also be mounted in other locations, such as above seat tracks, i.e., between an upper track and a pan frame.

Figure 2:
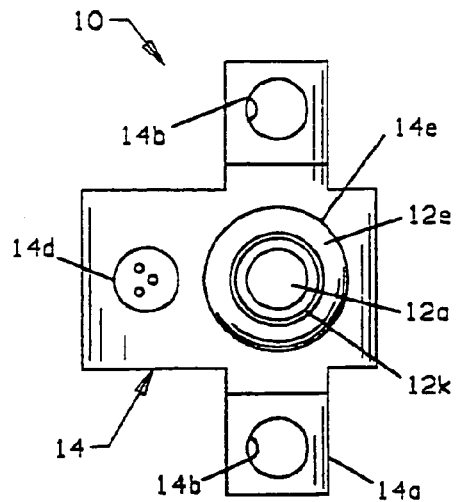
FIG. 2 is a top plan view of an occupant weight sensor made according to a first preferred embodiment of the invention.
Figure 2A:
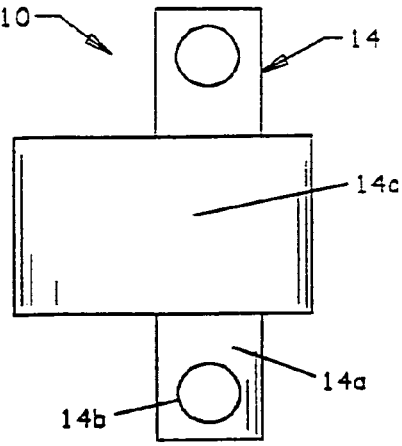
FIG. 2a is a bottom plan view thereof.
Figure 3:
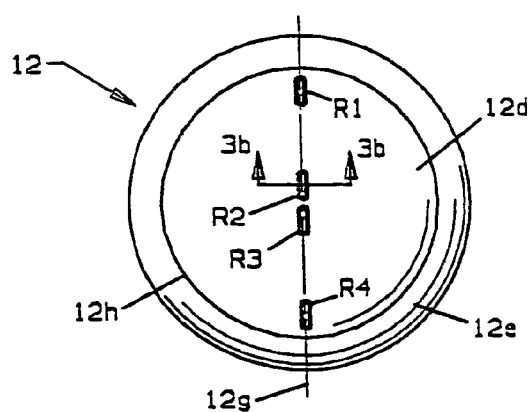
FIG. 3 is a top plan view of a sense element showing one preferred sense element array used in the FIG. 2 sensor.

FIGS. 2 and 3 show an occupant weight sensor 10 made according to a first preferred embodiment which incorporates functional components of FIG. 1. Sensor 10 comprises a sense element, best seen in FIGS. 3, 3a, formed of a unitary body 12 of suitable material, such as stainless steel, having a high yield point, good corrosion resistance and being compatible with the strain gauge attachment process, to be described. The body is formed with suitable means at one end to mechanically fasten the sense element to a suitable structure.

Although other fastening means could be employed, a threaded post 12a having a longitudinal axis 12b is shown. Preferably, a longitudinally extending orientation flat 12c is formed along the threaded post. On the other end of the body, a generally planar sense surface 12d is disposed essentially normal to longitudinal axis 12b. Although various configurations can be used, preferably sense surface 12d is circular in shape. The body also has a radial flange 12e extending outwardly beyond the sense surface forming an outer periphery to serve as a mechanical interface with a second body to be described.

Strain gauges comprising piezoresistors R1-R4 are fabricated from single crystal silicon and, as noted supra, provide a gauge factor of approximately 150. A glass bonding process, known in the industry, is used to permanently attach the gauges to sense surface 12d by means of glass 12f, as best seen in FIG. 3b, providing high sensitivity, good stability, good environmental resistance and strong overstress stability.

Ideally, an occupant weight sensor measures only the axial load applied to the sensor in a manner to be described below so that the weight of the occupant can be inferred. However, due to numerous effects, dimensional variation between components, variable system compliance and the like, forces are applied to the sense element outside of a "pure" axial force. These loads, frequently termed parasitic loads, shift the sensor offset and compromise the determination of the occupant weight.

A significant form of parasitic loads takes the form of moments about the sense element body. It has been found that gauge placement is important and that failure to place gauges in optimum location results in undesirable gauge performance. Improperly placed gauges result in reduced axial span as well as moment sensitivity.

The strain gauges are located so that, when the piezoresistors are electrically connected to form a full Wheatstone bridge as shown in FIG. 1, rejection of parasitic side-loads is enhanced. In the instant embodiment, piezoresistors are all disposed along a common diameter 12g of the circular sense surface with piezoresistors R1 and R4 closely adjacent to the outer periphery 12h on opposite sides of center and with piezoresistors R2, R3 closely adjacent to the center on opposite sides thereof.

Figure 2B:
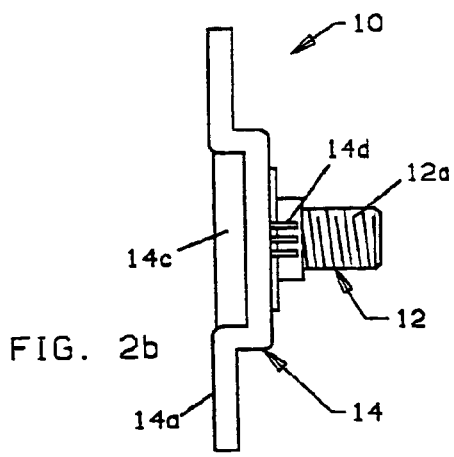
FIG. 2b is a left side elevational view thereof and FIG. 2c is a rear elevational view thereof.
Figure 2C:
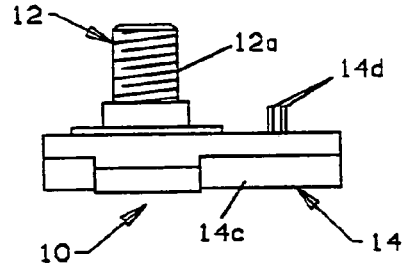

Sense element body 12 may be provided with a hub portion 12k on threaded post 12a providing a surface 12m as a load reacting surface. An annular groove 12n, shown in FIG. 3a but not shown in FIGS. 2b, 2c, may be formed between hub 12k and radial flange 12e to tailor the strain field in the area of the gauges.

A second body 14, formed of suitable material, such as stainless steel, which is provided with a centrally disposed opening 14e to receive sense element body 12 with radial flange 12e permanently attached to second body 14 as by laser welding about the outer periphery of the flange. Second body 14 comprises an elongated plate like element 14a having first and second ends with a mounting hole 14b disposed adjacent each end for attachment to suitable structure so that the sensor is interposed between support structure for the vehicle seat and the chassis of the vehicle. The portion of element 14a welded to radial flange 12e serves as a force transfer portion for the sense element 12.

Second body 14 also mounts a circuit board (not shown) to which the strain gauges are wire bonded. The board includes electronics for compensating the sense element output to achieve accurate output across a full temperature range. The electronics are sealed from the environment by an environmental cover 14c and a mating environmental seal (not shown). An electrical connector 14d provides a means for externally powering the sensor and receiving the sensor output.

Figure 3A:
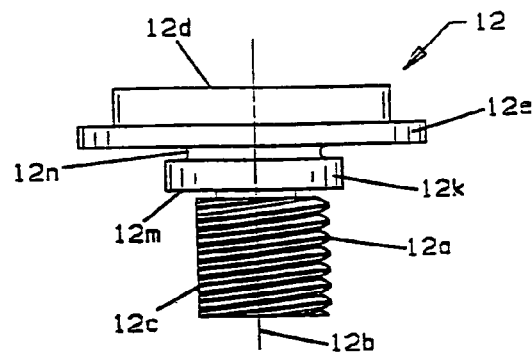
FIG. 3a is an elevational view thereof and FIG. 3b is a cross sectional view taken on line 3b-3b of FIG. 3.
Figure 3B:
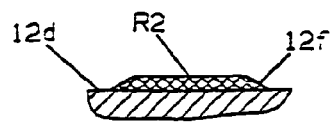
Figure 4:
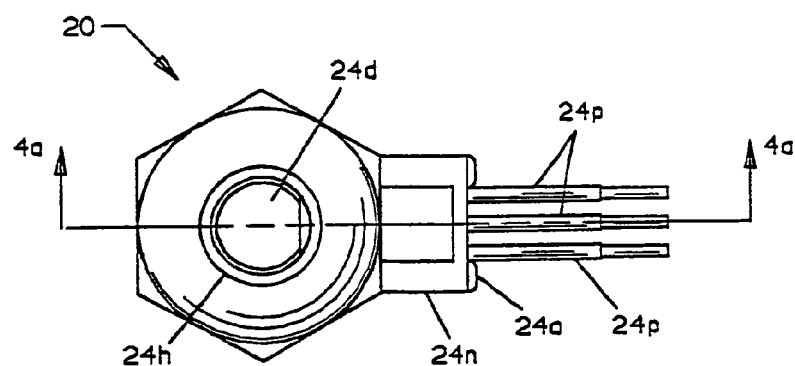
FIG. 4 is a top plan view of an occupant weight sensor made in accordance with a second preferred embodiment of the invention.
Figure 4A:
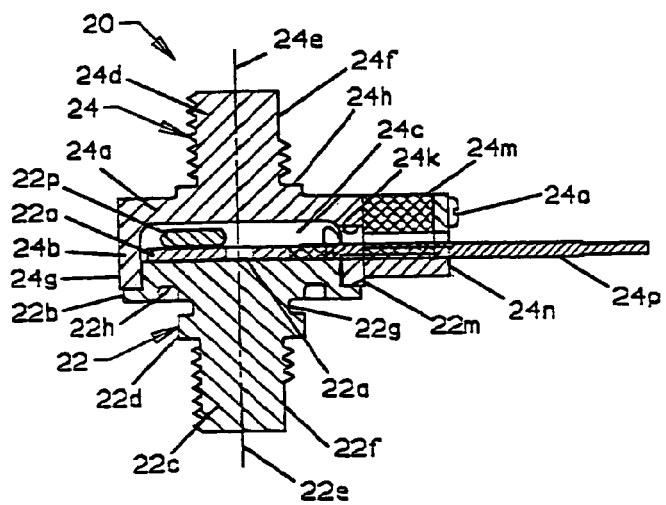
FIG. 4a is a cross sectional view taken on line 4a-4a of FIG. 4
Figure 4B:
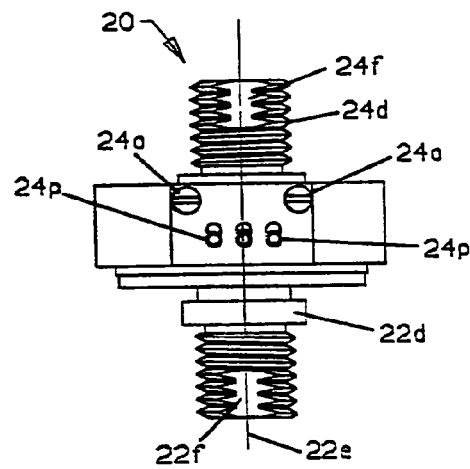
FIG. 4b is a right side elevational view of the FIG. 4 sensor.
Figure 5:
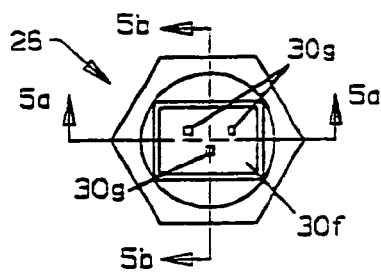
FIG. 5 is a top plan view of an occupant weight sensor made according to a third preferred embodiment of the invention.
Figure 5A:
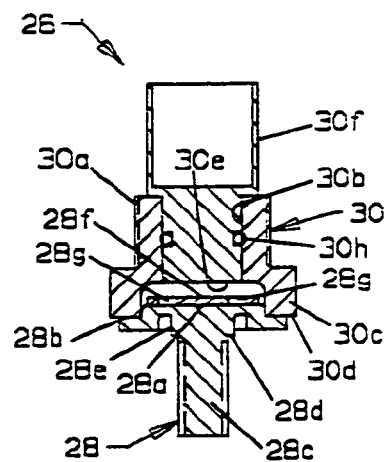
FIG. 5a is a cross sectional view taken on line 5a-5a of FIG. 5, 5b is a cross sectional view taken on line 5b-5b of FIG. 5
Figure 5B:
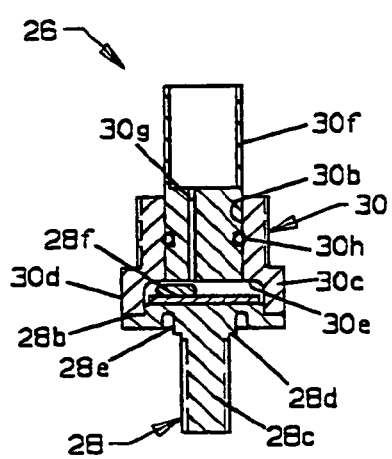
FIG. 5c is a perspective view of the FIG. 5 sensor.
Figure 5C:
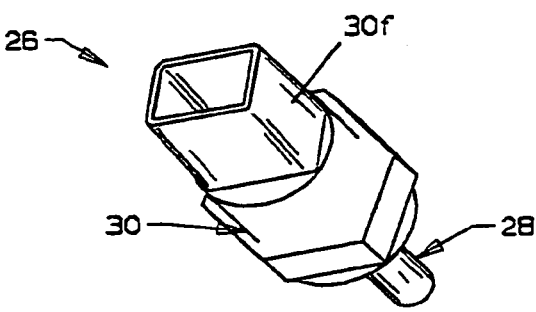

With reference to FIGS. 4, 4a and 4b, a second preferred embodiment of the invention shows an occupant weight sensor 20 comprising a sense element having a first body 22 similar to body 12 shown in FIGS. 3, 3a and formed with a generally planar circular sense surface 22a and having an outer periphery 22b thereabout in the form of an outwardly radially extending flange forming a stepped seating surface 22m axially spaced from the sense surface. Threaded post 22c extends in a first direction away from hub 22d of body 22 along a longitudinal axis 22e and preferably includes an orientation flat 22f. Longitudinal axis 22e is essentially normal to planar sense surface 20a and passes through the center of the circular sense surface. An annular groove 22g, comparable to groove 12n of FIG. 3a, is formed between body 22 of the sense element and threaded post 22c. Additionally, an annular groove 22h is formed in the exterior surface of body 22 between the post and the stepped seating surface 22m to tailor the strain field in the area of the gauges by flattening the strain field in that area. This will be described in greater detail below in connection with FIG. 8a.

A second body 24 comprises an end wall 24a formed with a tubular sidewall 24b to form a recess 24c. A second threaded post 24d extends away from end wall 24a along a longitudinal axis 24e. Threaded post 24d preferably is provided with an orientation flat 24f similar to flat 22f of the first body. The outer distal portion 24g of tubular wall 24b is received on stepped seat 22m, preferably spaced slightly from sense surface 22a and is permanently attached thereto around the periphery, as by welding. Preferably, an annular load application surface 24h is formed on second body 24 about post 24d. Loads applied to post 24d and surface 24h are transferred to the sense element through the outer distal portion 24g which serves as a force transfer portion. When bodies 22, 24 are attached to one another, the longitudinal axes 22e, 24e are essentially coincident passing through the center of the circular sense surface 22a.

Second body 24 is formed with an opening 24k in sidewall 24b to provide access for laterally extending connector 24m formed of suitable electrically insulative material attached to second body 24 along with strain relief cap 24n by suitable fasteners 24o. Wire leads 24p extend through the connector and strain relief cap and are connected to electronics (not shown) on circuit board 22o received in recess 24c. An output conditioning ASIC 22p is mounted on the circuit board and suitable piezoresistors are wire bonded to the circuit board, electrically connected to form a Wheatstone bridge.

FIGS. 5, 5a-5c show a third preferred embodiment of an occupant weight sensor made in accordance with the invention. Sensor 26 comprises a sense element similar to the sense elements of the previous embodiments with a circular planar sense surface 28a on which is mounted suitable piezoresistors electrically connected in the form of a Wheatstone bridge, a radially outwardly extending flange preferably longitudinally offset from the sense surface forming a seat 28b for receipt of the tubular force transfer portion of a second body to be discussed. A threaded post 28c extends outwardly from body 28 along the longitudinal axis which is essentially normal to the circular sense surface and which passes through the center thereof. A hub portion of the fixed end of the post forms an annular force transfer portion 28d and an annular groove 28e is formed in the exterior surface of body 28 intermediate to the post and seat 28b.

Second body 30 is formed with an externally threaded portion 30a formed with a longitudinally extending opening 30b through the body. Portion 30a is joined to tubular sidewall 30c having a distal end portion 30d, which serves as the force transfer portion, received on seat 28b of the first body member and permanently attached thereto as by welding. Sidewall 30c is preferably formed with an external polygonal, e.g., hexagonal, configuration to facilitate handling and mounting and internally defines an electronics receiving recess 30e. The external transition between wall portions 30a and 30c form an annular force application surface for applying a load to the sense element through annular seat 28b.

An electrical connector 30f formed of suitable electrically insulative material is received in opening 30b and mounts axially extending wire leads (not shown but received in holes 30g extending longitudinally through the connector). An environmental seal 30h is disposed between the connector and the wall of portion 30a defining opening 30b. A circuit board 28f with a signal conditioning ASIC is received in recess 30e and, as in the previous embodiments described above, electrical connections are made between piezoresistors mounted on sense surface 28a (not shown) exposed through openings 28g formed in the circuit board.

A fourth preferred embodiment of an occupant weight sensor is shown in FIGS. 6 and 6a-6g as well as FIG. 1a. Sensor 32 of this embodiment comprises a sense element having a first body 34 composed of suitable material such as stainless steel, see FIGS. 6b, 6c in particular, having a circular, planar sense surface 34a and having an outer periphery 34b preferably longitudinally offset from the sense surface to form an annular seat 34c. A second intermediate annular flange 34d is formed between seat 34c and sense surface 34a to facilitate assembly of other components to be discussed. A threaded post 34e extends away from body 34a along longitudinal axis 34f. A suitable orientation flat 34g may be formed on threaded post 34e or, as shown, on the outer periphery 34b. Post 34e is formed with a hub portion having a portion 34k of increasing diameter with increasing distance from body 34 and having a lower radially inwardly extending surface 34m which serves as a force reacting surface. An annular groove 34n is formed in the exterior surface of the body intermediate to the post and annular seat 34c. This groove serves to flatten the strain field on sense surface 34a in the region of piezoresistor placement near the outer periphery of the sense surface.

Single crystalline silicon piezoresistors or gauges are glass bonded to the sense surface as described above and electrically connected to form a full Wheatstone bridge and are disposed so that for each half bridge, one gauge increases resistance with increasing load and the other gauge decreases resistance with increasing load. In the instant embodiment, one gauge is aligned radially near the perimeter of the sense surface and the second gauge is aligned tangentially closely to the first gauge. As alluded to above, piezoresistors placed close to one another can comprise either individual pieces of silicon or they can be formed on the same silicon crystal. When a load couple is applied to the sense surface having such a half bridge, the output varies strongly with the angular orientation of the couple. By placing a second half bridge diametrically opposed to the first in a like orientation, the differential output of a full bridge is less sensitive to an applied couple. Further improvement can be obtained by tailoring the configuration of the sense element to flatten the strain field in the area of the gauges, as will be discussed further, below.

Figure 10:
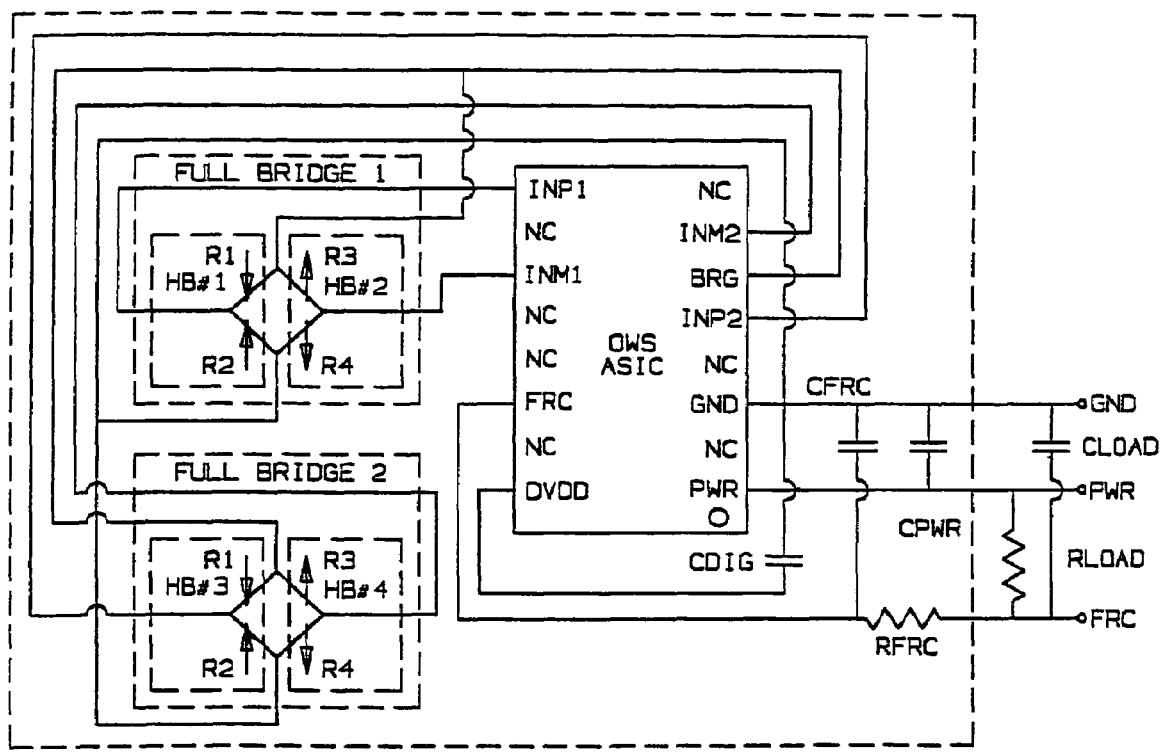
FIG. 10 is a schematic diagram, similar to FIG. 1, of an occupant weight sensor made in accordance with a modified preferred embodiment of the invention.
Figure 10A:
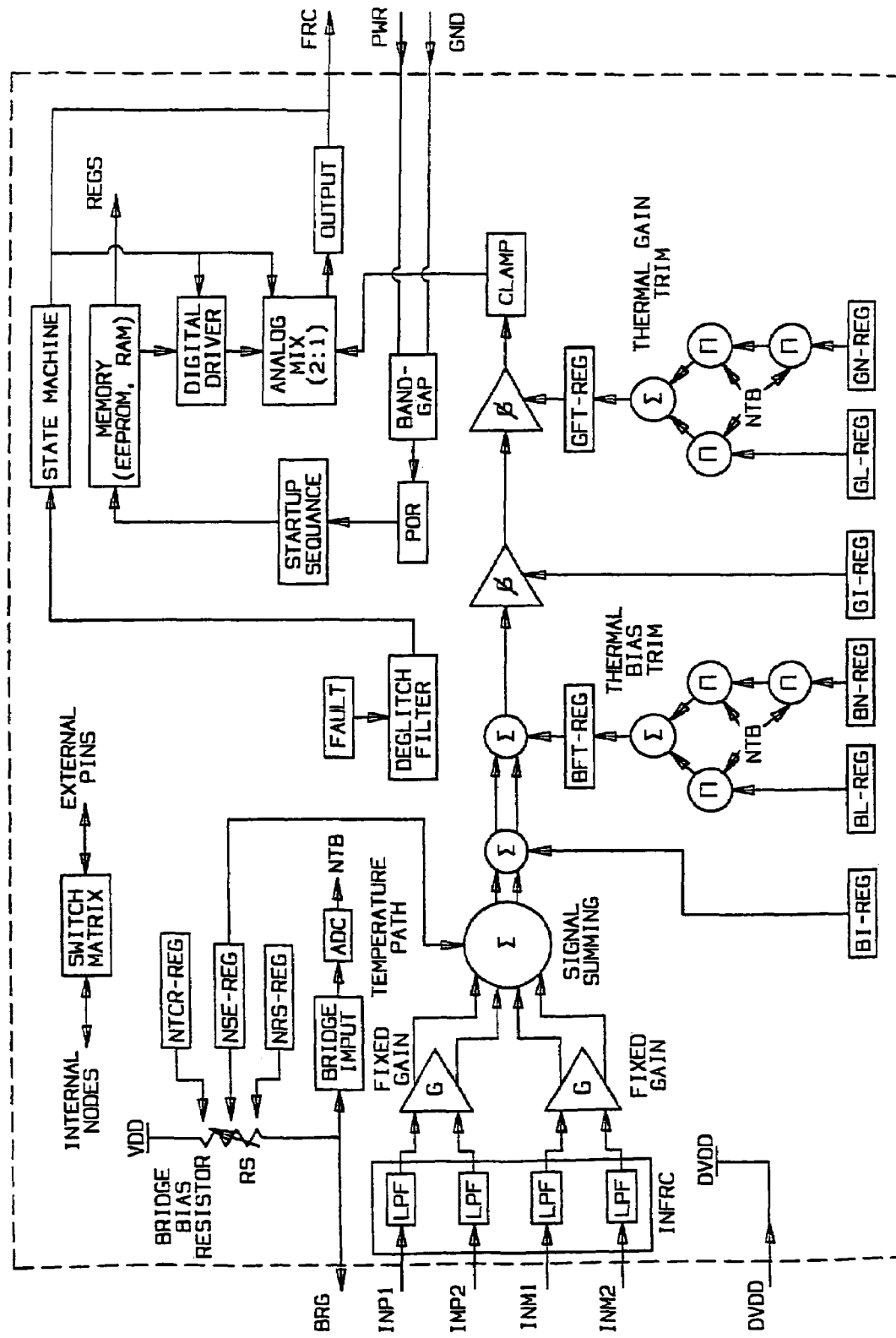
FIG. 10a is a block diagram of the FIG. 10 occupant weight sensor ASIC.

If desired, a second full bridge can be placed 180 degrees from the original full bridge and their outputs summed to be less sensitive to the applied moment and angular orientation thereof. The second bridge should have properties identical to the first. See FIGS. 10 and 10a which show a schematic of a sense element having two full Wheatstone bridges comprising piezoresistors R1, R2 of half bridge HB1; R3, R4 of half bridge HB2 of the first full bridge and R1, R2 of half bridge HB3 and R3, R4 of half bridge HB4 of the second full bridge. The summing circuit is located in the ASIC as shown in FIG. 10a.

Figure 6:
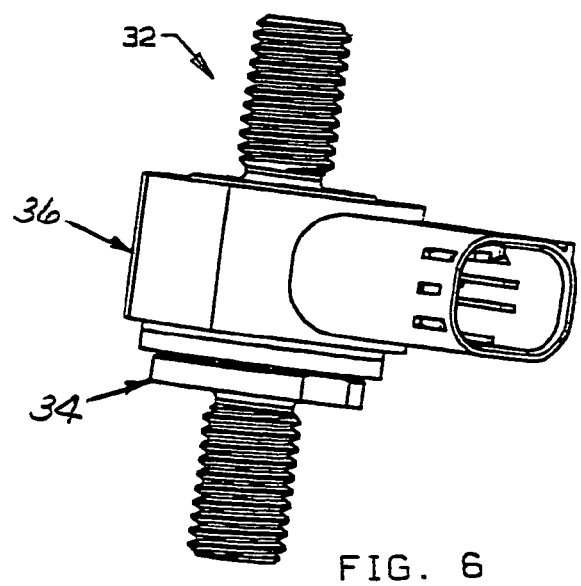
Figure 6A:
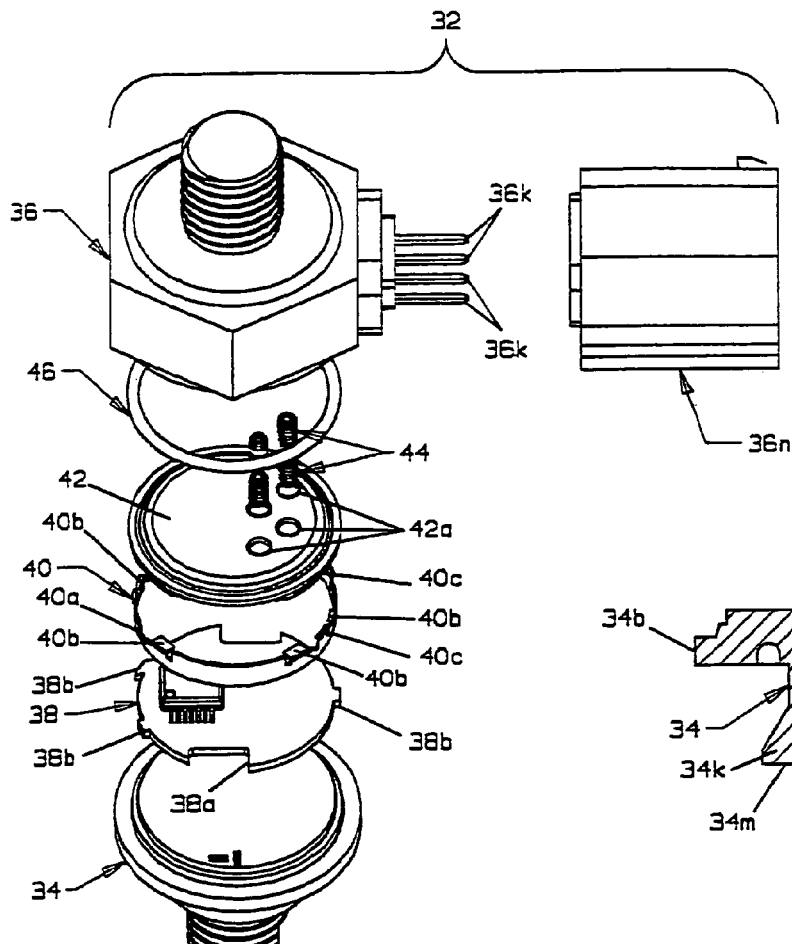
FIG. 6a is a blown apart perspective view of the FIG. 6 sensor.

As shown in FIG. 6a, in addition to sense element body 34, sensor 32 includes a second body 36, a circuit board 38, a weld ring 40, a contact holder 42, contact springs 44, and an environmental seal 46.

Circuit board 38 is disposed on sense surface 34a with cut-out portions 38a aligned with the piezoresistors bonded to the sense surface. A plurality of radially outwardly extending tabs 38b are received in slots 40a of weld ring 40, see FIG. 6d. The weld ring is slidingly received on annular flange 34d with folded over retainer tabs 40b engaging the top surface of circuit board 38. A generally disc shaped contact spring holder 42 having a plurality of through holes 42a respectively mount therein suitable contact coil springs 44. Weld ring 40 is formed with upwardly extending flanges 40c having a retention feature for receipt in complimentary retention features on the perimeter of the contact holder. Environmental seal 46 in the form of an O-ring is received on top of spring holder 42 with contact springs 44 engaging selected conductive pads on the circuit board on one end with the other end extending above the surface of the contact holder.

Figure 6B:
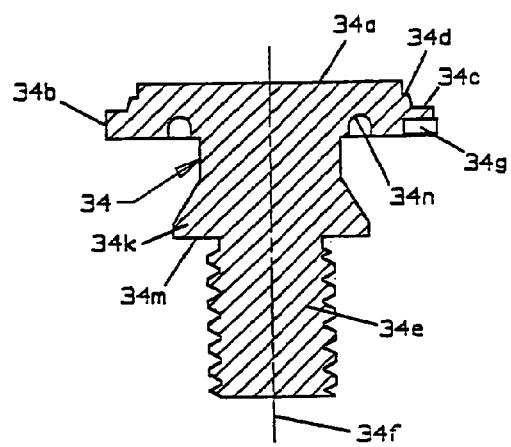
FIGS. 6b and 6c are respectively an elevational cross section and a perspective view of the sense element body of FIG. 6 showing a preferred arrangement of piezoresistor gauges mounted on a planar sense surface.
Figure 6C:
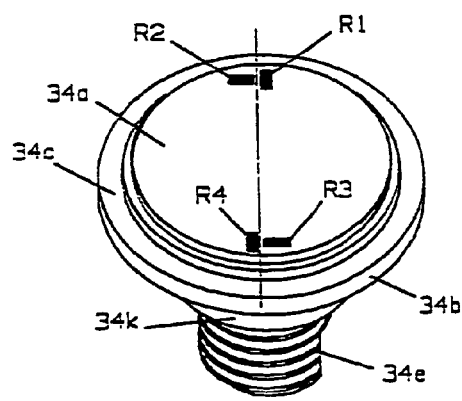
Figure 6D:
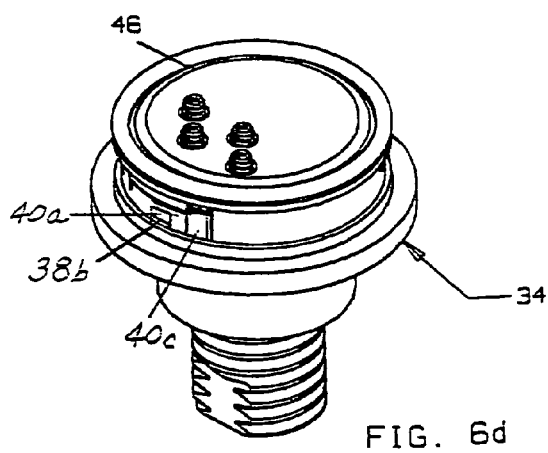
FIG. 6d is a perspective view similar to FIG. 6c but showing the sensor partially assembled.
Figure 6E:
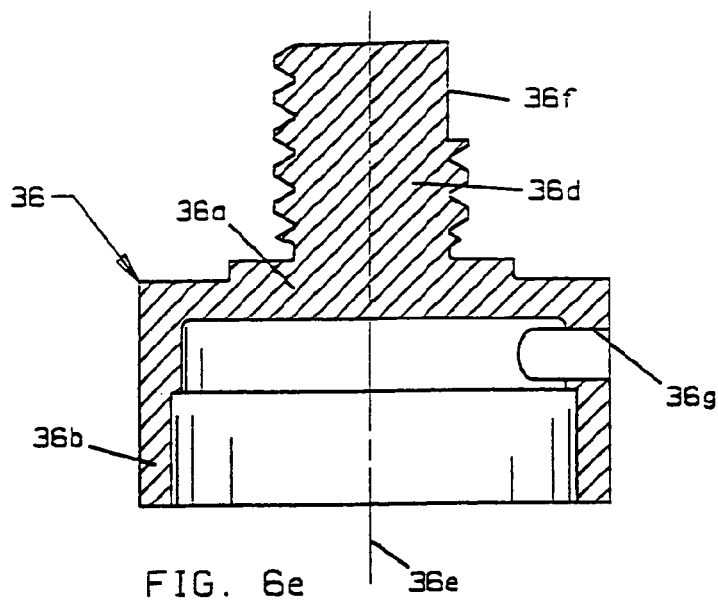
FIG. 6e is a cross sectional elevational view of a second body, also shown in FIG. 6a, for receipt on the sense element body.
Figure 6F:
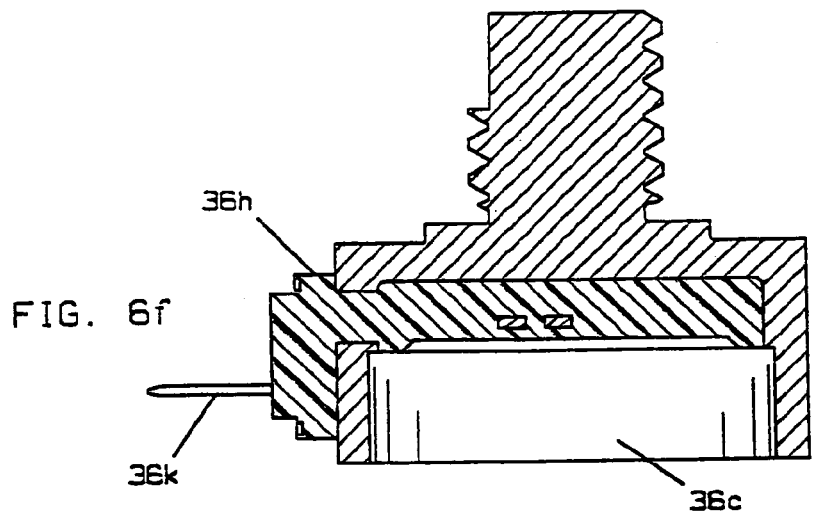
FIG. 6f is a cross sectional elevational view similar to FIG. 6e but in reverse orientation and shown with an insert molded connector assembly mounted thereon.
Figure 6G:
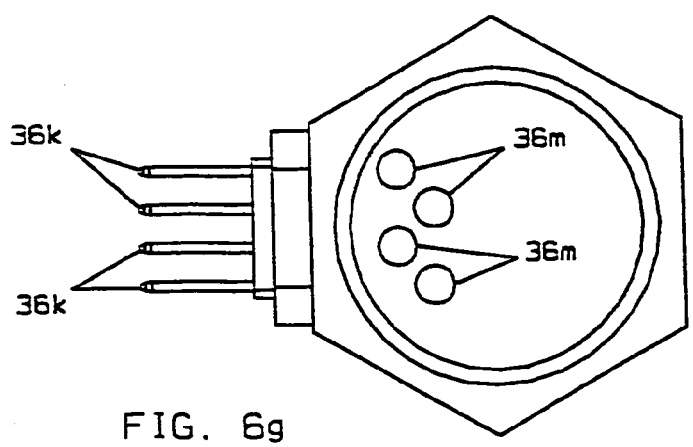
FIG. 6g is a bottom plan view of the FIG. 6f body using a slightly smaller scale than that of FIG. 6f.

Second body 36, see FIGS. 6e, 6f, is formed of suitable material such as stainless steel and has an end wall 36a and a tubular sidewall 36b defining a recess 36c. A threaded post 36d, which may be provided with an orientation flat 36f, extends outwardly from the body along a longitudinal axis 36e. An opening 36g is formed in sidewall 36b to allow placement of an insert molded connector/terminal assembly 36h, as seen in FIG. 6f, received through the opening and seated in recess 36c. Assembly 36h includes a plurality of terminals 36k, the terminals each having a conductive pad 36m exposed through a cut away portion of the connector/ terminal assembly, as shown in FIG. 6g. Second body 36 is received on first body 34 with the free end portion (force transfer portion) of tubular wall 36b received on seat 34c and attached thereto around the periphery as by laser welding. When the bodies are attached to one another, the longitudinal axes 34f and 36e essentially coincide and contact springs 44 engage conductive pads 36m of the connector/terminal assembly. After the bodies are welded together, an electrically insulative shroud 36n is received over terminals 36k and is attached to the connector, terminal assembly as by being ultrasonically welded thereto.

FIGS. 7, 7a-7c show modifications of the FIG. 6 sensor. Sensor 48 comprises a sense element having a first body 50 composed of suitable material, such as stainless steel, having a circular, planar sense surface, as in the FIG. 6 embodiment, and having an outer periphery 50a forming an annular seat for receiving the force transfer portion or distal free end 52a of the tubular sidewall of second body 52. As in the FIG. 6 sensor, a threaded post 52b extends away from second body 52 along a longitudinal axis which is coincident with longitudinal axis 50c of body 50 passing through the center of the sense surface once the bodies are joined together as by laser welding around the outer periphery as indicated at 53. A post 50b also extends away from body 50 along longitudinal axis 50c and is fixedly attached preferably to a central portion of an elongated bracket 54, as by welding thereto. Bracket 54 is formed with a mounting hole 54a adjacent to each opposite end of the elongated bracket for attachment to the first frame connected to the chassis of a vehicle. First body 50 is formed with an annular recess 50d in the outer surface of the body between post 50b and the outer periphery 50a, to be discussed below in relation to FIGS. 8, 8a.

Instead of weld ring 40 of the FIG. 6 sensor, a snap ring 56 having a locking feature in the form of an inwardly extending protrusion 56a formed on the inside surface thereof is received on first body 50 with the ring circumscribing the sense surface. Protrusion 56a is received in a recess 50e formed in a cylindrical sidewall portion of first body 50 defining the sense surface. Ring 56 may be formed with an orientation feature, such as longitudinally extending rib 56b received in a matching groove formed in the cylindrical wall portion. Ring 56 is generally cylindrical and, when seated on first body 50, extends above the sense surface and provides a mounting seat for contact spring holder 58 as well as forming a housing for silicone gel placed around the wire bonds connected to the ASIC. A suitable connector assembly 60 mounts pin terminals 60a which provides electrical connection to circuit board 50f through contact springs 44 as in the FIG. 6 sensor.

Figure 7:
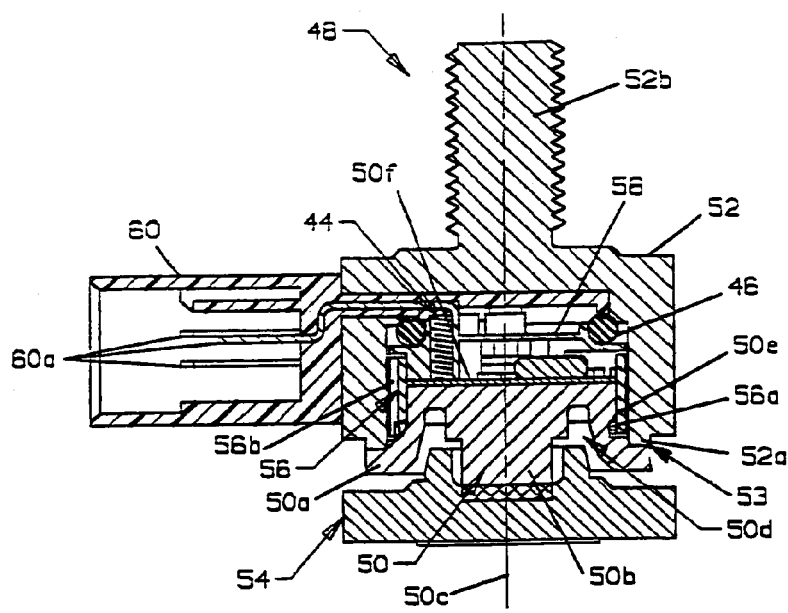
FIG. 7 is a cross sectional, elevational view of a modification of the FIG. 6 sensor taken on line 7-7 of FIG. 7a, FIG. 7a is an elevational view of the FIG. 7 modified structure.
Figure 7A:
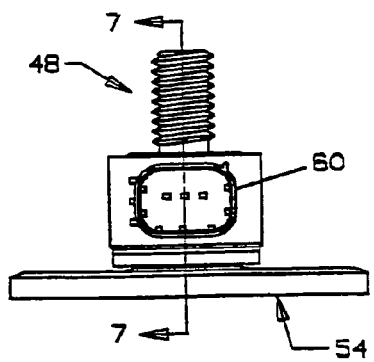
FIGS. 7b, 7c are top and bottom plan views, respectively, of the FIG. 7a sensor.
Figure 7B:
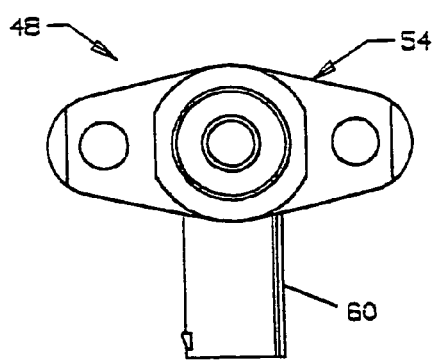
Figure 7C:
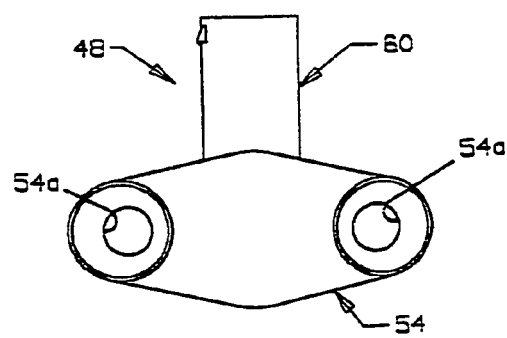
Figure 8:
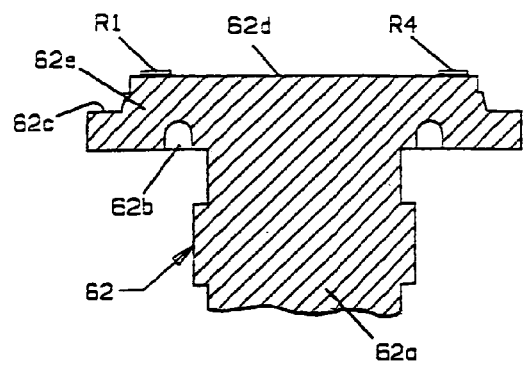
FIG. 8 is an elevational, broken away, cross sectional view of one preferred embodiment of a sense element.
Figure 8A:
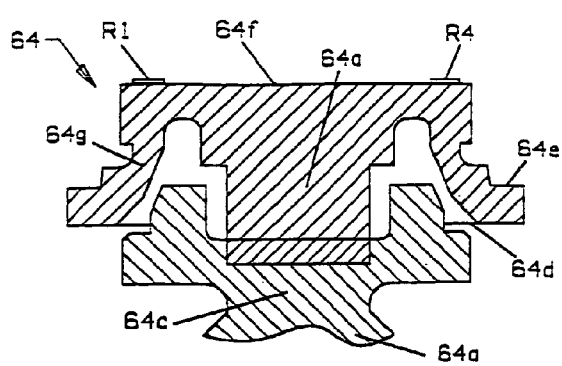
FIG. 8a is a similar view of a modified preferred embodiment of a sense element.

FIG. 8 shows a sense element 62, with its post 62a broken away, similar to those described in the preceding preferred embodiments, particularly the embodiment shown in FIG. 6b, while sense element 64 in FIG. 8a shows a sense element similar to that of sensor 48 of FIG. 7 but having a threaded post 64a rather than bracket 54. Post 64a is broken away for purposes of illustration. With respect to FIG. 8, annular groove 62b is formed in body 62 through the exterior surface between post 62a and annular seat 62c for seating the force transfer portion of a second body (not shown) received on and attached to the outer periphery of the body 62 for applying occupant load to the sensor. Groove 62b in effect forms an annular web 62e having a selected width between the groove and seat 62c and a selected length depending on the depth of the groove. The formation of this web serves to flatten the strain field on the outer circumferential portion of sense surface 62d.

Sense element 64 of FIG. 8a comprises first and second body portions 64a, 64c of suitable metallic material, such as stainless steel, welded together to form a unitary sense element formed with an annular recess or groove 64d, generally U-shaped in cross section at each side of the cross sectional view. The groove effectively is formed between the post and annular seat 64e and defines a web 64g between annular seat 64e and sense surface 64f which has a selected length greater than the selected width of the web. The ratio of a selected web length greater than the selected web width provides an enhanced flattening effect of the strain field in the outer peripheral portion of sense surface 64f.

Figure 9:
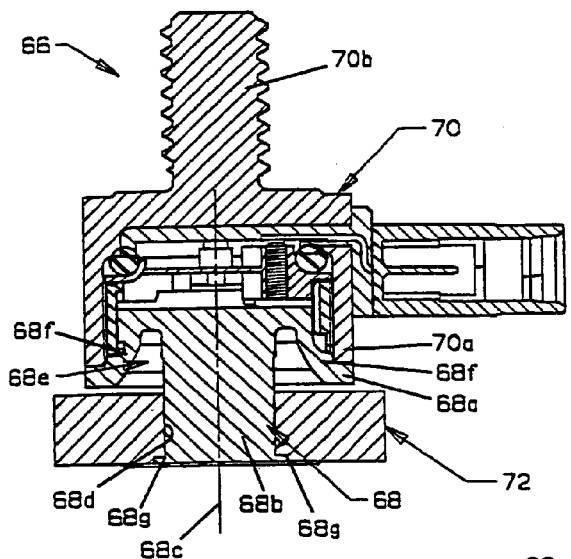
FIGS. 9 and 9a are cross sectional elevational views of slightly different scales of a modification of the FIG. 7 sensor.
Figure 9A:
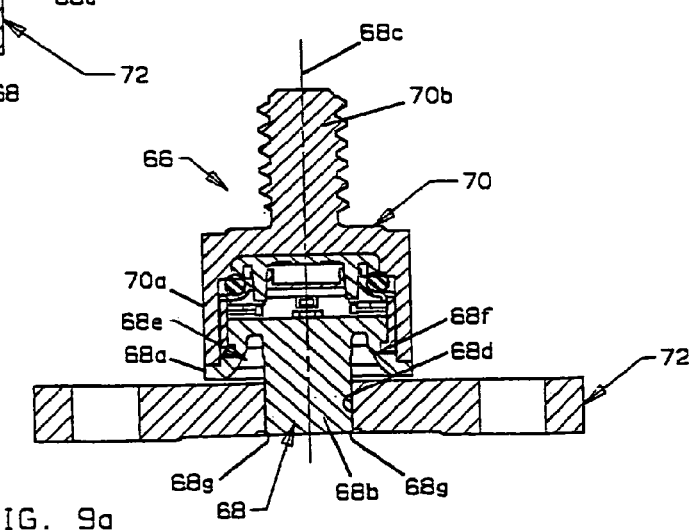

FIGS. 9 and 9a show a sensor similar to the FIG. 7 sensor but having a modified sense element. Sensor 66 comprises a sense element having a first body 68 composed of suitable material, such as stainless steel, having a circular planar sense surface as in the FIG. 7 embodiment, and having an outer periphery 68a forming an annular seat for receiving the force transfer portion or distal free end 70a of the tubular sidewall of second body 70. As in the FIG. 7 sensor, a threaded post 70b extends away from second body 70 along a longitudinal axis which is coincident with longitudinal axis 68c of body 68 passing through the center of the sense surface once the bodies are joined together as by laser welding around the outer periphery.

A post 68b also extends away from body 68 along longitudinal axis 68c and extends through a bore 68d formed through a bracket 72 and is fixedly attached to the bracket as by welding thereto at 68g on the lower side of the bracket. Any suitable welding procedure may be used such as $CO_2$ laser welding. In the FIG. 7 embodiment, axial loading results in the weld between post 50b and bracket 54 being placed in tension. As the bracket bends in high load conditions, since the bracket is held through mounting holes 54a, the spin weld is put in bending. High stresses are at the edge of the weld which can cause the weld to unzip. In the FIGS. 9, 9a embodiment, a more robust sense element is provided by inserting the post in bore 68d of bracket 72. Upon axial loading, weld 68g is placed in shear, even during bending of the bracket, with the load distributed across the full weld area.

As in the FIG. 7 embodiment, an annular recess 68e is formed in the outside surface of first body 68 between post 68b and the outer periphery 68a forming web 68f having a selected length greater than the selected width of the web.

The description of the FIG. 7 embodiment can be referred to for details of the remaining structure.

It should be understood that although particular embodiments of this invention have been described by way of illustrating the invention, other embodiments are also possible. The invention includes all modifications and equivalents of the disclosed embodiments falling within the scope of the appended claims.

What is claimed is:

1. An occupant weight sensor particularly adapted for vehicular seats wherein the vehicular seats are supported on the chassis by a seat mechanism and the sensor is interposed between the chassis and the seat mechanism comprising:

a sense element having a first body with a circular generally planar sense surface and having an outer periphery and a longitudinal axis, a post extending outwardly from the first body along the longitudinal axis for attachment to one of the chassis and the seat mechanism, a second body formed with a force transfer portion permanently attached to the sense element along the outer periphery thereof and having a mounting portion for attachment to the other of the chassis and the seat mechanism so that the sensor is disposed intermediate to the chassis and the seat mechanism, a full Wheatstone bridge having piezoresistors attached to the generally planar sense surface and having a bridge output, said full Wheatstone bridge comprising first and second half bridges disposed symmetrically along a common diameter of the circular sense surface, the first half bridge has a first piezoresistor aligned radially adjacent to the outer periphery of the sense surface along the common diameter on one side of the center of the circular sense surface and a second piezoresistor aligned tangentially disposed closely adjacent to the first piezoresistor, the second half bridge has a third piezoresistor aligned tangentially disposed adjacent to the outer periphery of the sense surface and a fourth piezoresistor aligned radially adjacent to the outer periphery of the sense surface along the common diameter on the other side of the center of the circular sense surface disposed closely adjacent to the third piezoresistor, conditioning electronics supported on one of the first and second bodies electrically connected to the bridge for conditioning the bridge output signal, and a connector for providing electrical power for the bridge and for providing an electrical output.

2. An occupant weight sensor according to claim 1 in which the outwardly extending post is threaded.

3. An occupant weight sensor according to claim 1 further comprising an elongated bracket having first and second ends, the first post being fixedly attached to the bracket intermediate to the first and second ends, and a mounting hole is formed adjacent to each end for attachment to the chassis.

4. An occupant weight sensor according to claim 1 in which at least one half bridge is formed on a common piece of silicon.

5. An occupant weight sensor according to claim 1 in which the piezoresistors are glass bonded to the sense surface.

6. An occupant weight sensor according to claim 1 further comprising a second full Wheatstone bridge having piezoresistors disposed 180 degrees from the piezoresistors of the first full bridge and having a second bridge output and further comprising a summing circuit connected to the outputs of each full bridge.

7. An occupant weight sensor according to claim 1 in which the force transfer portion of the second body comprises a sidewall having an opening formed through the sidewall and the connector is received through the opening.

8. An occupant weight sensor according to claim 1 in which the force transfer portion of the second body comprises a generally cylindrical sidewall having a second longitudinal axis, the second body formed with an opening therethrough extending along the second longitudinal axis and the connector is received through the opening and extends generally parallel to the longitudinal axis.

9. A strain gauge sense element comprising:

a first generally cylindrical body having a first longitudinal axis and a portion formed with a circular generally planar sense surface lying in a plane generally perpendicular to the first longitudinal axis, the body having an outer periphery circumscribing the sense surface, a first post extending outwardly from the body along the first longitudinal axis, a plurality of strain gauges disposed on the sense surface, a second body having a sidewall forming a recess and being attached to the outer periphery of the first body, the second body having a second longitudinal axis generally coincident with the first longitudinal axis when the first and second bodies are attached to one another, a second post extending outwardly from the second body along the second longitudinal axis, and a circumferential groove formed in the outer surface of the first body forming a web extending between the outer periphery of the first body and the portion of the first body formed with the planar sense surface so as to define the strain fields on the sense surface sensed by the strain gapes.

10. A strain gauge sense element according to claim 9 in which the web has a selected length and width and the selected length is greater than the selected width.

11. An occupant weight sensor comprising:

a sense element having a first generally cylindrical metallic body having a first longitudinal axis and having a generally planar sense surface lying in a plane generally perpendicular to the first longitudinal axis, the first body having an outer periphery and a first post extending outwardly from the first body along the first longitudinal axis, a full Wheatstone bridge comprising four piezoresistors affixed to selected locations on the sense surface, a printed circuit board disposed on the sense surface and being configured to leave an opening over each piezoresistor, conditioning electronics mounted on the printed circuit board and formed with selected electrical paths, the piezoresistors electrically connected to form a bridge and electrically coupled to the conditioning electronics and selected circuit paths, a ring circumscribing the printed circuit board and being attached to the first body, the ring formed with contact holder retention features, a contact holder having ring retention features cooperating with the contact holder retention features, the contact holder received on the ring and attached thereto through the retention features, a plurality of contact members mounted on the contact holder, a second generally cylindrical body having a second longitudinal axis and having a sidewall formed with a recess, the sidewall fixed to the outer periphery of the first body with the second longitudinal axis generally coincident with, the first longitudinal axis, a second post extending outwardly from the second body along the second longitudinal axis, an opening formed in the sidewall, and a connector received through the opening, the connector having a plurality of electrical terminals and the contact members of the contact holder extending from the respective terminals of the connector to respective selected circuit paths on the printed circuit board.

12. An occupant weight sensor according to claim 11 in which the full Wheatstone bridge comprises two half bridges, each half bridge having two piezoresistors, one piezoresistor of each half bridge disposed on the sense surface adjacent to the outer portion of the circular sense surface and being aligned radially diametrically opposite one another and the second piezoresistor of each half bridge being disposed closely adjacent to the first respective piezoresistor and being aligned tangentially relative to the circular sense surface.

13. An occupant weight sensor according to claim 12 in which the piezoresistors are glass bonded to the sense surface.

14. An occupant weight sensor according to claim 11 in which the first and second bodies are laser welded together along the outer periphery of the first body.

15. An occupant weight sensor according to claim 11 further comprising a radially extending flange formed on the first post spaced from the body to serve as a force reacting surface and an annular surface on the second body circumscribing the second post serves as an axial loading surface.

16. An occupant weight sensor particularly adapted for vehicular seats wherein the vehicular seats are supported on the chassis by a seat mechanism and the sensor is interposed between the chassis and the seat mechanism comprising:

a sense element having a first body with a generally planar sense surface and having an outer periphery and a longitudinal axis, a post extending outwardly from the first body along the longitudinal axis for attachment to one of the chassis and the seat mechanism, a second body formed with a force transfer portion permanently attached to the sense element along the outer periphery thereof and having a mounting portion for attachment to the other of the chassis and the seat mechanism so that the sensor is disposed intermediate to the chassis and the seat mechanism, the second body comprising an elongated plate like element having first and second ends, the force transfer portion is centrally located between the first and second ends and is formed by an opening in the second body and is welded to the outer periphery of the first body, the elongated plate formed with a mounting hole adjacent to each end for attachment to the seat mechanism, a full Wheatstone bridge having piezoresistors attached to the generally planar sense surface and having a bridge output, conditioning electronics supported on one of the first and second bodies electrically connected to the bridge for conditioning the bridge output signal, and a connector for providing electrical power for the bridge and for providing an electrical output.

17. An occupant weight sensor particularly adapted for vehicular seats wherein the vehicular seats are supported on the chassis by a seat mechanism and the sensor is interposed between the chassis and the seat mechanism comprising:

a sense element having a first body with a generally planar sense surface and having an outer periphery and a longitudinal axis, a post extending outwardly from the first body along the longitudinal axis for attachment to one of the chassis and the seat mechanism, a second body formed with a force transfer portion permanently attached to the sense element along the outer periphery thereof and having a mounting portion for attachment to the other of the chassis and the seat mechanism so that the sensor is disposed intermediate to the chassis and the seat mechanism, the second body having a second longitudinal axis, an end wall and a tubular sidewall defining a recess, the sidewall serving as the force transfer portion and a second post extends outwardly from the end wall along the second longitudinal axis, when the first body and the second body are attached to one another the second longitudinal axis is generally coincident with the first longitudinal axis and the recess extends over the sense surface, a full Wheatstone bridge having piezoresistors attached to the generally planar sense surface and having a bridge output, conditioning electronics supported on one of the first and second bodies electrically connected to the bridge for conditioning the bridge output signal, and a connector for providing electrical power for the bridge and for providing an electrical output.

18. An occupant weight sensor particularly adapted for vehicular seats wherein the vehicular seats are supported on the chassis by a seat mechanism and the sensor is interposed between the chassis and the seat mechanism comprising:

a sense element having a first body with a circular planar sense surface and having an outer periphery and a longitudinal axis, a post extending outwardly from the first body along the longitudinal axis for attachment to one of the chassis and the seat mechanism, a second body formed with a force transfer portion permanently attached to the sense element along the outer periphery thereof and having a mounting portion for attachment to the other of the chassis and the seat mechanism so that the sensor is disposed intermediate to the chassis and the seat mechanism, a full Wheatstone bridge having piezoresistors attached to the generally planar sense surface and having a bridge output, said full Wheatstone bridge comprising first and second half bridges with the four piezoresistors disposed along a common diameter of the circular sense surface, the first half bridge has a first piezoresistor disposed adjacent to the outer periphery of the sense surface at one end of the common diameter and a second piezoresistor disposed adjacent to the center of the circular sense surface and the second half bridge has a third piezoresistor disposed adjacent to the center of the circular sense surface and a fourth piezoresistor disposed adjacent to the outer periphery of the sense surface at the opposite end of the common diameter, conditioning electronics supported on one of the first and second bodies electrically connected to the bridge for conditioning the bridge output signal, and a connector for providing electrical power for the bridge and for providing an electrical output.

* * * * *